United States Patent
Deng et al.

(10) Patent No.: US 11,181,995 B2
(45) Date of Patent: Nov. 23, 2021

(54) TRACEABLE OPTICAL DEVICE

(71) Applicant: HTC Corporation, Taoyuan (TW)

(72) Inventors: Qing-Long Deng, Taoyuan (TW); Li-Hsun Chang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 38 days.

(21) Appl. No.: 16/286,598

(22) Filed: Feb. 27, 2019

(65) Prior Publication Data
US 2019/0302905 A1 Oct. 3, 2019

Related U.S. Application Data

(60) Provisional application No. 62/635,557, filed on Feb. 27, 2018.

(51) Int. Cl.
*G06F 3/038* (2013.01)
*A63F 13/235* (2014.01)
(Continued)

(52) U.S. Cl.
CPC .......... *G06F 3/0383* (2013.01); *A63F 13/213* (2014.09); *A63F 13/235* (2014.09); *A63F 13/24* (2014.09); *A63F 13/26* (2014.09); *A63F 13/833* (2014.09); *G02B 27/0172* (2013.01); *G06F 1/163* (2013.01); *G06F 1/1686* (2013.01); *G06F 3/011* (2013.01); *G06F 3/017* (2013.01); *G06F 3/0325* (2013.01); *G06F 3/0346* (2013.01); *A63F 2300/1031* (2013.01); *A63F 2300/8082* (2013.01); *G02B 27/017* (2013.01); *G06F 2203/0384* (2013.01); *G08C 23/04* (2013.01); *G08C 2201/32* (2013.01)

(58) Field of Classification Search
CPC .............................. G06F 3/041; A61B 8/4254
See application file for complete search history.

(56) References Cited

U.S. PATENT DOCUMENTS 4,996,632 A * 2/1991 Aikens ...................... F21V 9/40
362/560
5,283,772 A * 2/1994 Miyake .................. G11B 7/131
369/112.12
(Continued)

FOREIGN PATENT DOCUMENTS

KR     101483372 B1   1/2015
WO     2016/142845 A1 9/2016

OTHER PUBLICATIONS

"JIT Catalog R1", https://sites.google.com/site/jitdownload/JITCatalog-R1.zip?attredirects=0, pp. 1, 6.
(Continued)

*Primary Examiner* — William Lu
(74) *Attorney, Agent, or Firm* — CKC & Partners Co., LLC

(57) ABSTRACT

A traceable optical device is capable of being tracked by an electronic device having an image sensor. The traceable optical device includes a light guide member, at least one light source, and a shielding member. The light guide member has at least one light-incident surface and a light-emitting surface connected to each other. The light source is configured to emit light into the light guide member from the light-incident surface. The shielding member shields the light guide member and has at least one light transmission area.

18 Claims, 10 Drawing Sheets

100H

(51) Int. Cl.
*G02B 27/01* (2006.01)
*G06F 3/01* (2006.01)
*G06F 3/03* (2006.01)
*G06F 1/16* (2006.01)
*A63F 13/213* (2014.01)
*G06F 3/0346* (2013.01)
*A63F 13/24* (2014.01)
*A63F 13/833* (2014.01)
*A63F 13/26* (2014.01)
*G08C 23/04* (2006.01)

(56) References Cited

U.S. PATENT DOCUMENTS

| | | | | |
|---|---|---|---|---|
| 5,796,450 | A * | 8/1998 | Kanda | F21V 7/00 349/64 |
| 5,871,521 | A * | 2/1999 | Kaneda | A61N 5/0601 607/89 |
| 6,398,778 | B1 * | 6/2002 | Gu | G02B 6/0008 356/72 |
| 7,204,629 | B2 * | 4/2007 | Pipo | E01C 17/00 362/555 |
| 7,256,899 | B1 * | 8/2007 | Faul | G01B 11/2522 356/623 |
| 7,559,680 | B2 * | 7/2009 | Lath | G01V 8/10 362/145 |
| 8,795,078 | B1 | 8/2014 | Musick, Jr. et al. | |
| 9,477,026 | B2 * | 10/2016 | Ito | F21V 13/14 |
| 9,835,782 | B2 * | 12/2017 | Ito | A61B 1/00096 |
| 9,863,611 | B2 * | 1/2018 | Gutekunst | G08B 5/36 |
| 10,232,770 | B2 * | 3/2019 | LeCompte | B60Q 3/20 |
| 10,585,334 | B2 * | 3/2020 | Ichihara | G03B 15/05 |
| 2004/0032748 | A1 * | 2/2004 | Trudeau | G09F 9/305 362/554 |
| 2004/0070965 | A1 * | 4/2004 | Lin | G02B 6/0071 362/604 |
| 2006/0158899 | A1 * | 7/2006 | Ayabe | F21K 9/68 362/602 |
| 2006/0277571 | A1 * | 12/2006 | Marks | A63F 13/10 725/37 |
| 2007/0070645 | A1 * | 3/2007 | Coushaine | F21V 29/74 362/555 |
| 2008/0019657 | A1 * | 1/2008 | Maitland | G02B 6/262 385/140 |
| 2008/0062116 | A1 * | 3/2008 | Morbieu | G02F 1/133603 345/102 |
| 2008/0261693 | A1 | 10/2008 | Zalewski | |
| 2008/0291668 | A1 * | 11/2008 | Aylward | G02B 6/0068 362/225 |
| 2009/0162011 | A1 * | 6/2009 | Coe-Sullivan | G02B 6/0065 385/31 |
| 2012/0050975 | A1 * | 3/2012 | Garelli | H01Q 1/42 361/679.27 |
| 2012/0062713 | A1 * | 3/2012 | Flinsenberg | A47L 9/00 348/61 |
| 2013/0039090 | A1 * | 2/2013 | Dau | F21V 7/0025 362/551 |
| 2013/0215024 | A1 * | 8/2013 | Nakayama | H04W 4/80 345/157 |
| 2013/0222736 | A1 * | 8/2013 | Qi | G06F 1/1601 349/65 |
| 2013/0258709 | A1 * | 10/2013 | Thompson | G02B 6/0025 362/608 |
| 2014/0340424 | A1 * | 11/2014 | Ellsworth | G02B 27/0172 345/633 |
| 2015/0124482 | A1 * | 5/2015 | Kuromizu | G02B 6/0088 362/611 |
| 2015/0305627 | A1 * | 10/2015 | Islam | G01N 21/88 433/27 |
| 2015/0355408 | A1 * | 12/2015 | Lay | G02B 6/001 362/555 |
| 2015/0379351 | A1 * | 12/2015 | Dibenedetto | A61B 5/486 345/633 |
| 2016/0307332 | A1 * | 10/2016 | Ranjan | A63F 13/235 |
| 2016/0327906 | A1 * | 11/2016 | Futterer | G03H 1/02 |
| 2017/0192495 | A1 | 7/2017 | Drinkwater et al. | |
| 2017/0205552 | A1 * | 7/2017 | Gierens | G02B 6/0035 |
| 2017/0273665 | A1 * | 9/2017 | Kapoor | A61B 34/20 |
| 2017/0354864 | A1 | 12/2017 | Rogers et al. | |
| 2018/0299972 | A1 * | 10/2018 | Saito | G06F 3/0304 |
| 2019/0039510 | A1 * | 2/2019 | Chen | G02B 6/005 |
| 2020/0319391 | A1 * | 10/2020 | Vasylyev | G02B 6/001 |

OTHER PUBLICATIONS

Corresponding European search report dated Jul. 22, 2019.
The office action of the corresponding Taiwanese application dated Jun. 9, 2020.

* cited by examiner

TRACEABLE OPTICAL DEVICE

CROSS-REFERENCE TO RELATED APPLICATION

This application claims priority to U.S. Provisional Application Ser. No. 62/635,557, filed on Feb. 27, 2018, which is herein incorporated by reference.

BACKGROUND

Technical Field

The present disclosure relates to an electronic device, and more particularly, to a traceable optical device.

Description of Related Art

One of the rapidly growing technologies in the field of human-computer interaction is various head-mounted displays (HMDs), which may be worn on a user's head and have one or two displays in front of the user's eyes. This type of display has multiple commercial applications involving simulation of virtual reality including video games, medicine, sport training, entertainment applications, and so forth. In the gaming field, these displays may be used, for example, to render three-dimensional (3D) virtual game worlds.

Nowadays, computer vision methods, in particular, object tracking, are widely used in various applications. For example, object tracking may be used in a virtual reality (VR) system to detect the location of a handle held by a user. More specifically, the location and orientation of a handle can be determined by detecting feature points on the handle. However, when being held in front of a high-intensity light source in a dim environment, the feature points of the handle are always hard to be detected.

Accordingly, it is an important issue for the industry to provide a traceable optical device capable of solving the aforementioned problems.

SUMMARY

An aspect of the disclosure is to provide a traceable optical device that can efficiently solve the aforementioned problems.

According to an embodiment of the disclosure, a traceable optical device is capable of being tracked by an electronic device having an image sensor. The traceable optical device includes a light guide member, at least one light source, and a shielding member. The light guide member has at least one light-incident surface and a light-emitting surface connected to each other. The light source is configured to emit light into the light guide member from the light-incident surface. The shielding member shields the light guide member and has at least one light transmission area.

In an embodiment of the disclosure, the shielding member includes a hollow housing. At least a part of the light guide member is in the hollow housing.

In an embodiment of the disclosure, the light guide member and the light source are in the hollow housing.

In an embodiment of the disclosure, the light source is outside the hollow housing.

In an embodiment of the disclosure, the shielding member further includes a reflective layer on an inner surface of the hollow housing.

In an embodiment of the disclosure, the shielding member further includes a light diffusion structure on an inner surface of the hollow housing.

In an embodiment of the disclosure, the traceable optical device further includes a light distribution member in the hollow housing. The light distribution member is connected to the light guide member and optically coupled between the light-emitting surface and the light transmission area.

In an embodiment of the disclosure, the light guide member and the light distribution member form a unitary structure and have different refractive indices.

In an embodiment of the disclosure, the refractive index of the light guide member is greater than the refractive index of the light distribution member.

In an embodiment of the disclosure, the light distribution member is detachably engaged with the light guide member.

In an embodiment of the disclosure, the light guide member and the light distribution member are made of an identical material.

In an embodiment of the disclosure, said at least one light transmission area is at least one opening of the hollow housing. The light distribution member fills the opening.

In an embodiment of the disclosure, said at least one light transmission area is at least one opening of the hollow housing.

In an embodiment of the disclosure, the light-emitting surface of the light guide member is in contact with an edge of the opening.

In an embodiment of the disclosure, the light-emitting surface of the light guide member seals the opening.

In an embodiment of the disclosure, the hollow housing includes a non-transparent part and at least one transparent part connected to each other. The transparent part serves as the light transmission area.

In an embodiment of the disclosure, a number of said at least one light-incident surface and a number of said at least one light source are both two. The light sources are optically coupled to the light-incident surfaces respectively.

In an embodiment of the disclosure, the light guide member is tubular and has two ends. The light-incident surfaces are respectively at the ends of the light guide member.

In an embodiment of the disclosure, the shielding member is an opaque layer coated on the light-emitting surface of the light guide member.

In an embodiment of the disclosure, the light-incident surface and the light-emitting surface form an entire appearance of the light guide member.

Accordingly, in the traceable optical device of the present disclosure, after the light source emits light into the light guide member, the light can be transmitted in the light guide member and uniformly leave the light guide member from the light-emitting surface thereof. The light leaving the light guide member passes through the light transmission area of the shielding member to be detected. As such, the traceable optical device can provide a traceable optical feature with high brightness contrast which can be easily identified, so that the location and/or orientation of the traceable optical device can be easily determined. Moreover, by using the light guide member to transmit the light emitted from the light source and uniformly distribute the light leaving from the light-emitting surface thereof, the need to increase the number of the light source can be greatly reduced, so that the traceable optical device is low in electrical power loss.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
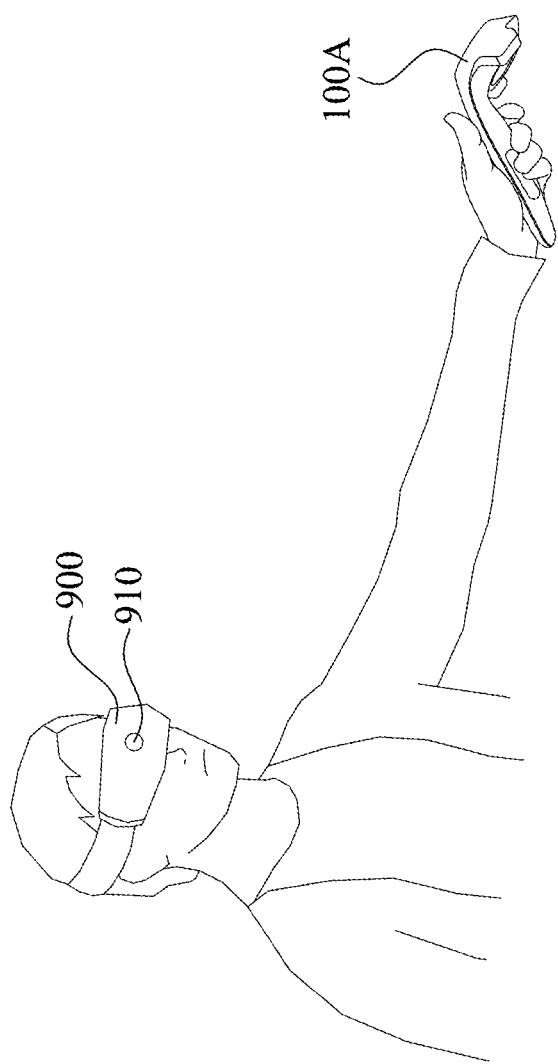
FIG. 1 is a schematic view illustrating a user interacting with a head-mounted display (HMD) and a traceable optical device according to some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

Reference is made to FIG. 1. FIG. 1 is a schematic view illustrating a user interacting with a head-mounted display (HMD) 900 and a traceable optical device 100A according to some embodiments of the present disclosure. In some embodiments, the HMD 900 may communicate wirelessly (e.g., WiFi, Bluetooth, etc.) with a computing device. In some embodiments, the HMD 900 may be wired directly to the computing device or in communication with the computing device via a network (e.g., the Internet). For example, the computing device may be a server on a network that provides game services. In some embodiments, the HMD 900 is a game playing device and the game is executed directly on the HMD 900, without the need of an external device to run the game.

In some embodiments, the HMD 900 is equipped with a camera 910 thereon. The camera 910 may be a regular image camera, a stereo camera (i.e., with two or more lenses that capture images from the playing area), an infrared camera, a depth camera, a 3D camera, etc. Images taken by the camera 910 may be processed to track the location and movement of the traceable optical device 100A. The traceable optical device 100A may be a one-handed controller illustrated in FIG. 1, but the disclosure is not limited in this regard.

In some embodiments, the user holds the traceable optical device 100A. The camera 910 is used to track the location and movement of the traceable optical device 100A, and operations related to the motion of the traceable optical device 100A may be used as inputs for the game. For example, the traceable optical device 100A may represent the handle of a sword, and the sword is displayed in the game scene. As the user moves the traceable optical device 100A, the sword moves in the virtual world in synchronism with the traceable optical device 100A. This way, the player is able to perform a fighting game operation where the sword is the weapon. In one embodiment, a relative position between the HMD 900 and the traceable optical device 100A is calculated. The relative position is then used by the game to move a game object in synchronism with the HMD 900.

Figure 2A:
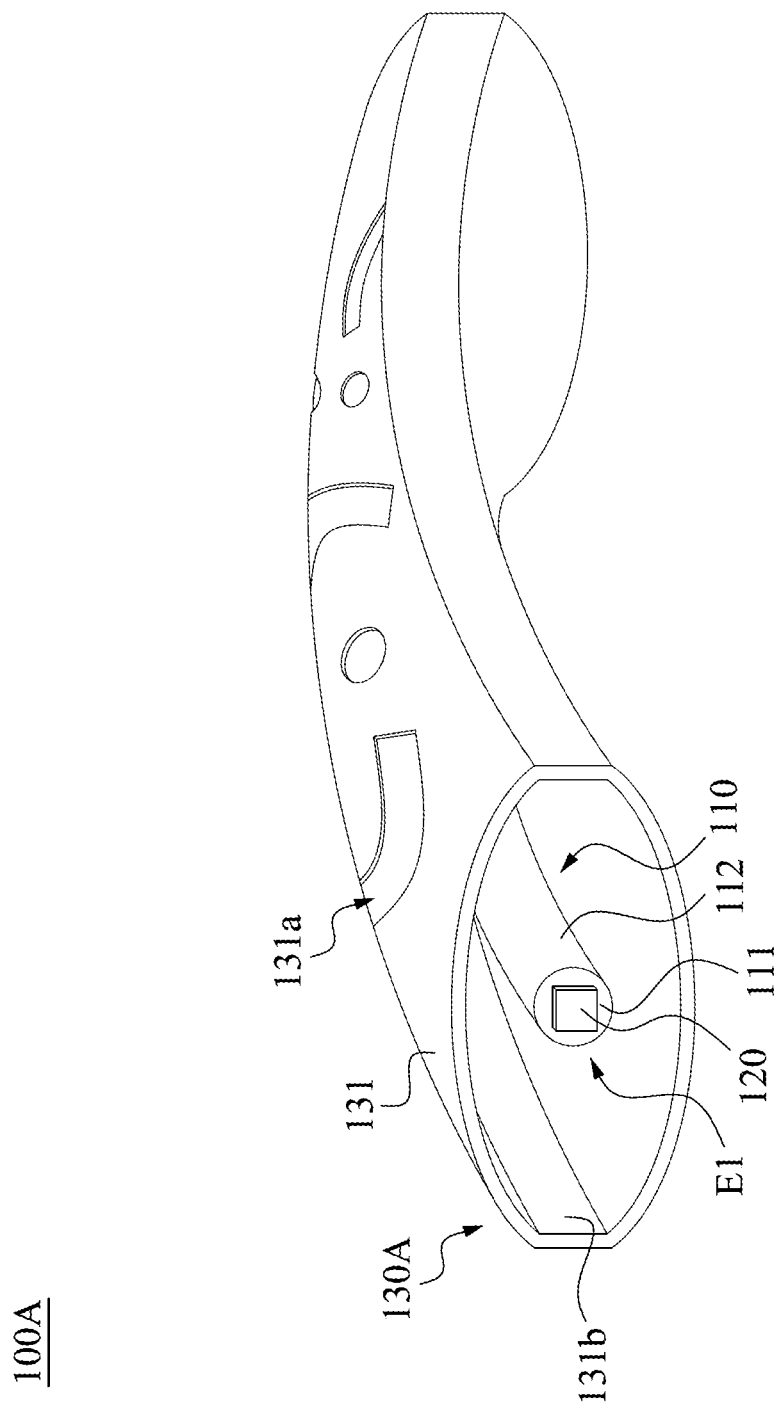
FIG. 2A is a partial schematic view of a traceable optical device according to some embodiments of the present disclosure.
Figure 2B:
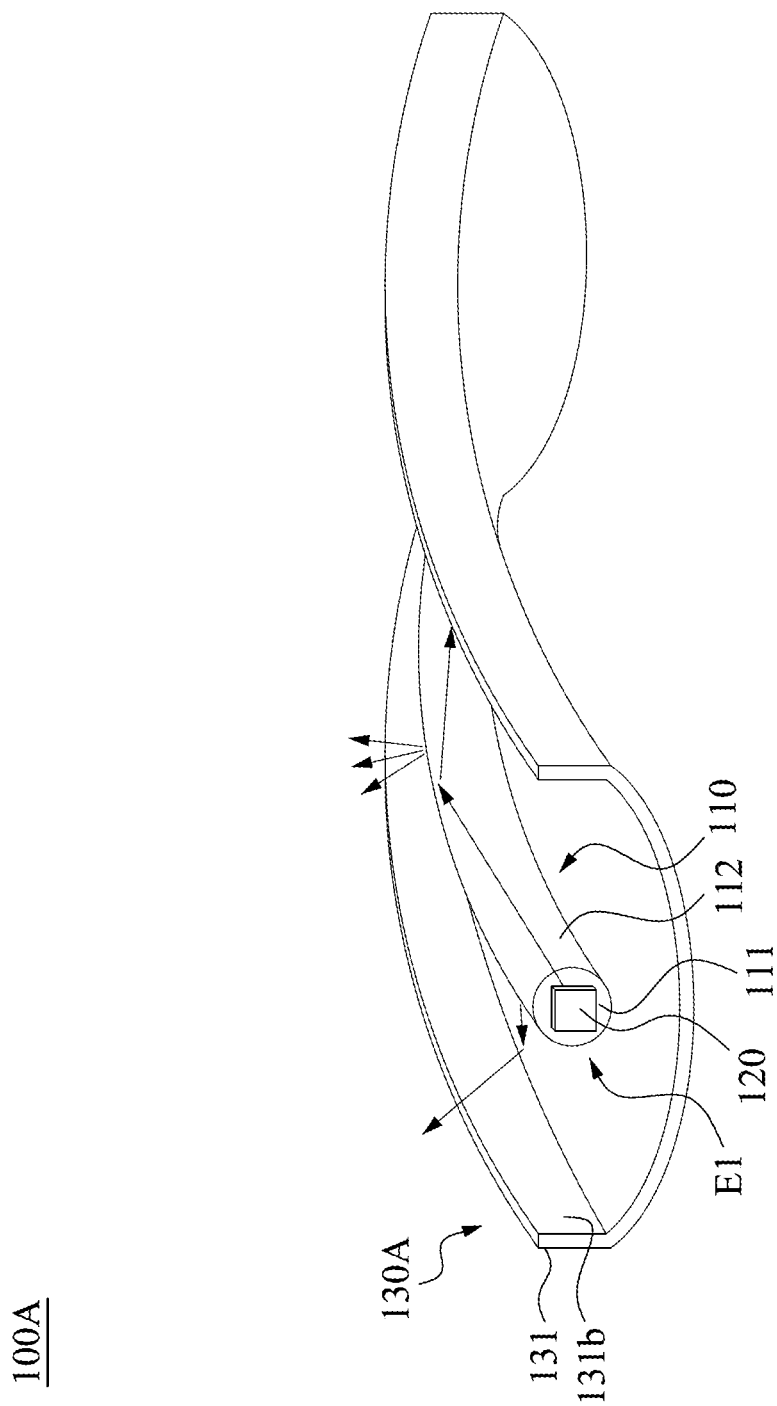
FIG. 2B is another partial schematic view of the traceable optical device in FIG. 2A according to some embodiments of the present disclosure.

Reference is made to FIGS. 2A and 2B. FIG. 2A is a partial schematic view of the traceable optical device 100A according to some embodiments of the present disclosure. FIG. 2B is another partial schematic view of the traceable optical device 100A in FIG. 2A according to some embodiments of the present disclosure. The traceable optical device 100A includes a light guide member 110, a light source 120, and a shielding member. The light guide member 110 has a light-incident surface 111 and a light-emitting surface 112 connected to each other. The light source 120 is configured to emit light into the light guide member 110 from the light-incident surface 111. The shielding member shields the light guide member 110 and has a plurality of light transmission areas.

In some embodiments, as illustrated in FIGS. 2A and 2B, the shielding member includes a hollow housing 130A. The light guide member 110 and the light source 120 are in the hollow housing 130A. In some embodiments, the light guide member 110 is tubular. The light-incident surface 111 is at an end E1 of the light guide member 110. That is, the light-incident surface 111 is an end face of the light guide member 110, and the light-emitting surface 112 is a curved surface of the light guide member 110 extended away from the end E1. In some embodiments, the light-incident surface 111 and the light-emitting surface 112 form an entire appearance of the light guide member 110. After the light source 120 emits light into the light guide member 110, the light can be transmitted in the light guide member 110 and uniformly leave the light guide member 110 from the light-emitting surface 112 thereof. In detail, with the principle of total internal reflection, the luminous flux of the light source 120 is continuously transmitted to the other end in the light guide member 110. The light guide member 110 may be made of a transparent material (e.g., plastic, polymer, glass, etc.), so when the light does not satisfy the condition of total internal reflection, the light will be emitted from the light-emitting surface 112 of the light guide member 110. Thus, in addition to transmitting the luminous flux of the light source 120, the light guide member 110 also emits light over the entire light-emitting surface 112.

In practice, some design parameters of the light guide member 110 (e.g., the angle of the light emitted by the light source 120, the shape of the light guide member 110, the material of the light guide member 110, etc.) can be adjusted by the assistance of an optical simulation software, so as to let the light leave the light-emitting surface 112 uniformly.

Figure 3:
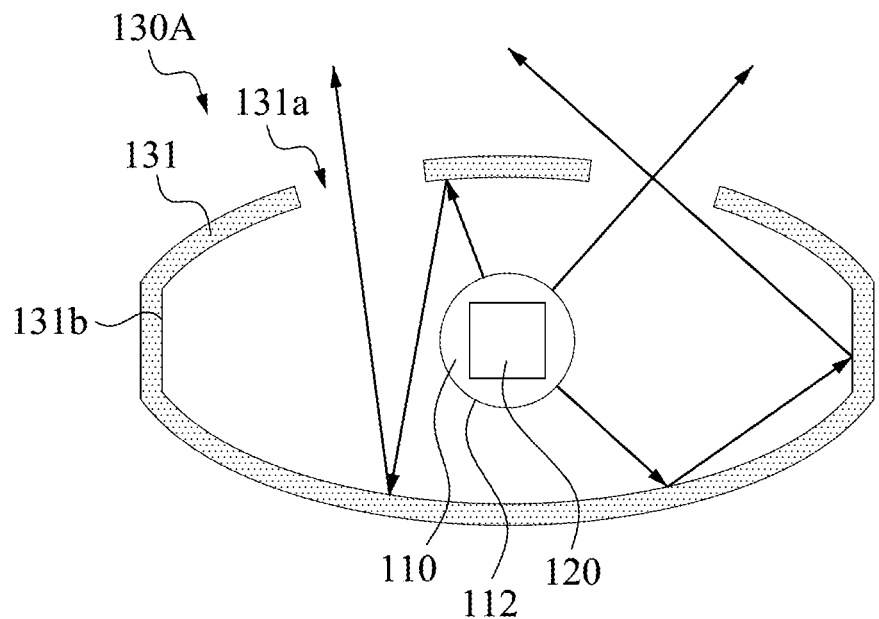
FIG. 3 is a cross-sectional view of a traceable optical device according to some embodiments of the present disclosure.

Reference is made to FIG. 3. FIG. 3 is a cross-sectional view of the traceable optical device 100A according to some embodiments of the present disclosure. As shown in FIGS. 2A-3, in some embodiments, the hollow housing 130A includes a non-transparent part 131, and the light transmission areas of the shielding member are openings 131a of the non-transparent part 131. In some embodiments, the non-transparent part 131 may be made of an opaque material. In some other embodiments, the non-transparent part 131 may be made of a transparent material with an opaque layer coated on the inner surface 131b (and/or an outer surface) of the non-transparent part 131. After the light leaves the light guide member 110 from the light-emitting surface 112 thereof, some parts of the light may directly leave the hollow housing 130A through the openings 131a to be detected, and some parts of the light may be reflected by an inner surface 131b of the non-transparent part 131 one or more times before leaving the hollow housing 130A through the openings 131a to be detected. As such, most of the light can be uniformly mixed in the hollow housing 130A before leaving the hollow housing 130A through the openings 131a.

With the foregoing optical configurations, the traceable optical device 100A can provide a traceable optical feature with high brightness contrast which can be easily identified, so that the location and/or orientation of the traceable optical device 100A can be easily determined. Moreover, by using the light guide member 110 to transmit the light emitted from the light source 120 and uniformly distribute the light leaving from the light-emitting surface 112 thereof, the need to increase the number of the light source 120 can be greatly reduced, so that the traceable optical device 100A is low in electrical power loss.

Figure 4:
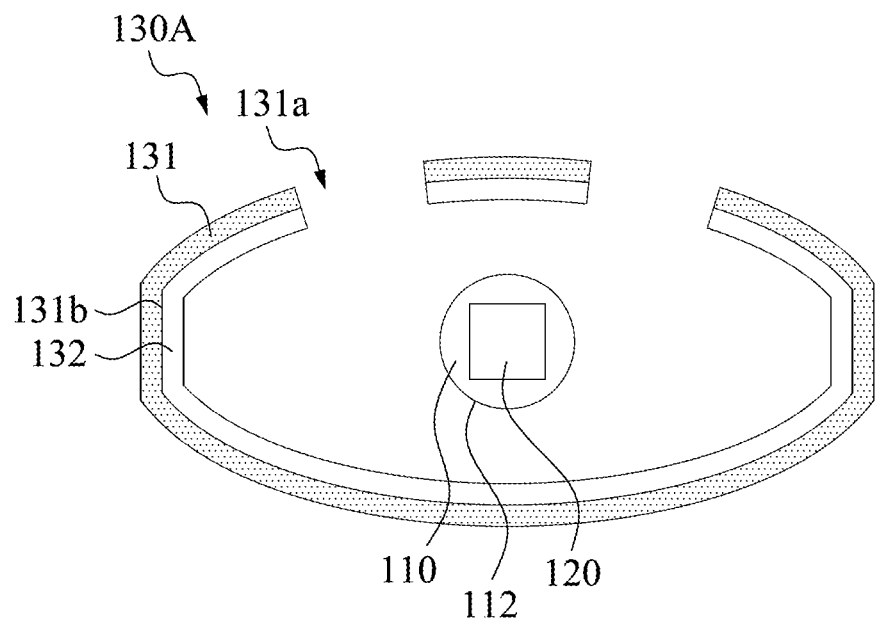
FIG. 4 is a cross-sectional view of a traceable optical device according to some embodiments of the present disclosure.

Reference is made to FIG. 4. FIG. 4 is a cross-sectional view of a traceable optical device 100B according to some embodiments of the present disclosure. As shown in FIG. 4, in some embodiments, the traceable optical device 100B includes a light guide member 110, a light source 120, and a shielding member, and the shielding member includes a hollow housing 130A. The light guide member 110, the light source 120, and the hollow housing 130A are identical or similar to those of the embodiments as illustrated by FIGS. 2A-3, therefore descriptions of these components are the same and would not be repeated here for simplicity. Compared to the embodiments as illustrated by FIGS. 2A-3, the shielding member of the embodiments as illustrated by FIG. 4 further includes a reflective layer 132 on the inner surface 131b of the hollow housing 130A. As such, the light reflected in the hollow housing 130A can be more evenly mixed and has less light loss. In some embodiments, the reflective layer 132 may be a metal layer, but the disclosure is not limited in this regard.

Figure 5:
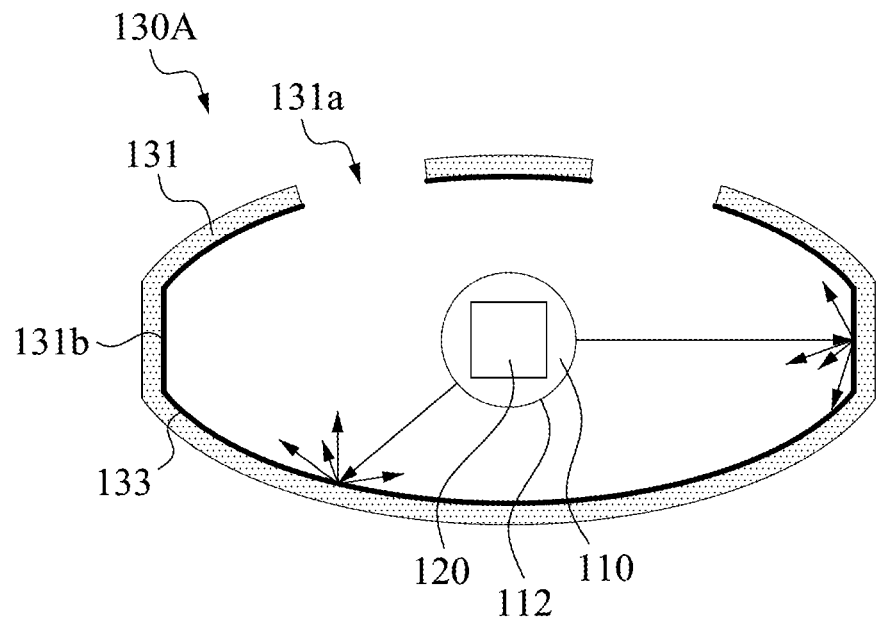
FIG. 5 is a cross-sectional view of a traceable optical device according to some embodiments of the present disclosure.

Reference is made to FIG. 5. FIG. 5 is a cross-sectional view of a traceable optical device 100C according to some embodiments of the present disclosure. As shown in FIG. 5, in some embodiments, the traceable optical device 100C includes a light guide member 110, a light source 120, and a shielding member, and the shielding member includes a hollow housing 130A. The light guide member 110, the light source 120, and the hollow housing 130A are identical or similar to those of the embodiments as illustrated by FIGS. 2A-3, therefore descriptions of these components are the same and would not be repeated here for simplicity. Compared to the embodiments as illustrated by FIGS. 2A-3, the shielding member of the embodiments as illustrated by FIG. 5 further includes a light diffusion structure 133 on the inner surface 131b of the hollow housing 130A. As such, the light reflected in the hollow housing 130A can be more evenly mixed. In some embodiments, the light diffusion structure 133 may include a plurality of tiny protrusions (e.g., white dots) distributed on the inner surface 131b of the hollow housing 130A, but the disclosure is not limited in this regard. In some embodiments, the inner surface 131b of the hollow housing 130A may have a large surface roughness, so as to serve as the light diffusion structure 133. In other words, the light diffusion structure 133 may be an inner part of the hollow housing 130A.

Figure 6:
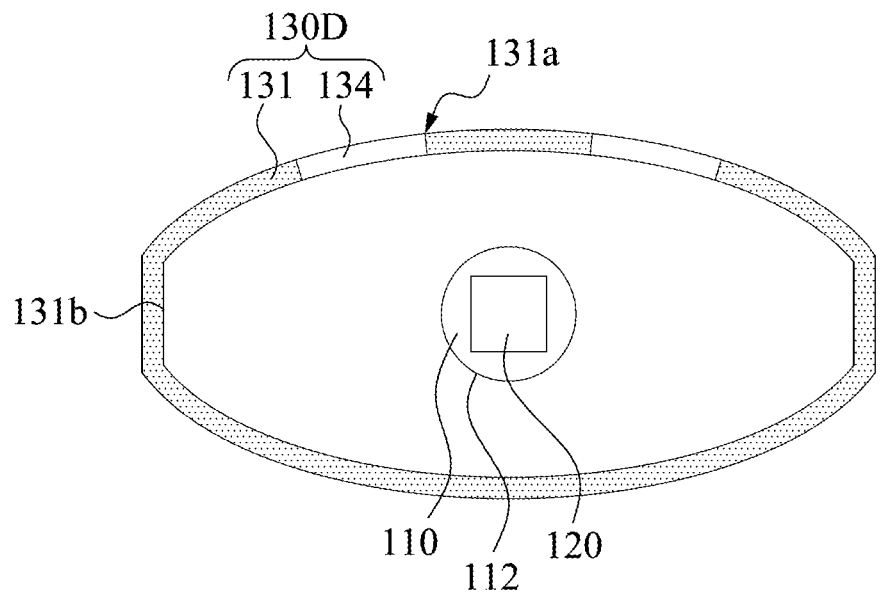
FIG. 6 is a cross-sectional view of a traceable optical device according to some embodiments of the present disclosure.

Reference is made to FIG. 6. FIG. 6 is a cross-sectional view of a traceable optical device 100D according to some embodiments of the present disclosure. As shown in FIG. 6, in some embodiments, the traceable optical device 100D includes a light guide member 110, a light source 120, and a shielding member. The light guide member 110 and the light source 120 are identical or similar to those of the embodiments as illustrated by FIGS. 2A-3, therefore descriptions of these components are the same and would not be repeated here for simplicity. Compared to the embodiments as illustrated by FIGS. 2A-3, the shielding member of the embodiments as illustrated by FIG. 6 includes a hollow housing 130D. The hollow housing 130D includes a non-transparent part 131 and a plurality of transparent parts 134 connected to each other. The transparent parts 134 serve as the light transmission areas of the shielding member. That is, the hollow housing 130D has no opening, and the light reflected in the hollow housing 130D may leave the hollow housing 130D through the transparent parts 134. As such, the light guide member 110 and the light source 120 may be sealed in the hollow housing 130D, so that dirt (e.g., dust or liquid) can be prevented from entering the hollow housing 130D. In some embodiments, the non-transparent part 131 may be made of an opaque material. In some other embodiments, the non-transparent part 131 and the transparent parts 134 may be made of a transparent material with an opaque layer coated on the inner surface 131b (and/or an outer surface) of the non-transparent part 131. In some embodiments, structures/textures/features may be added to a surface of the transparent part 134 to increase light uniformity and to freely define the angle of diffusion.

Figure 7:
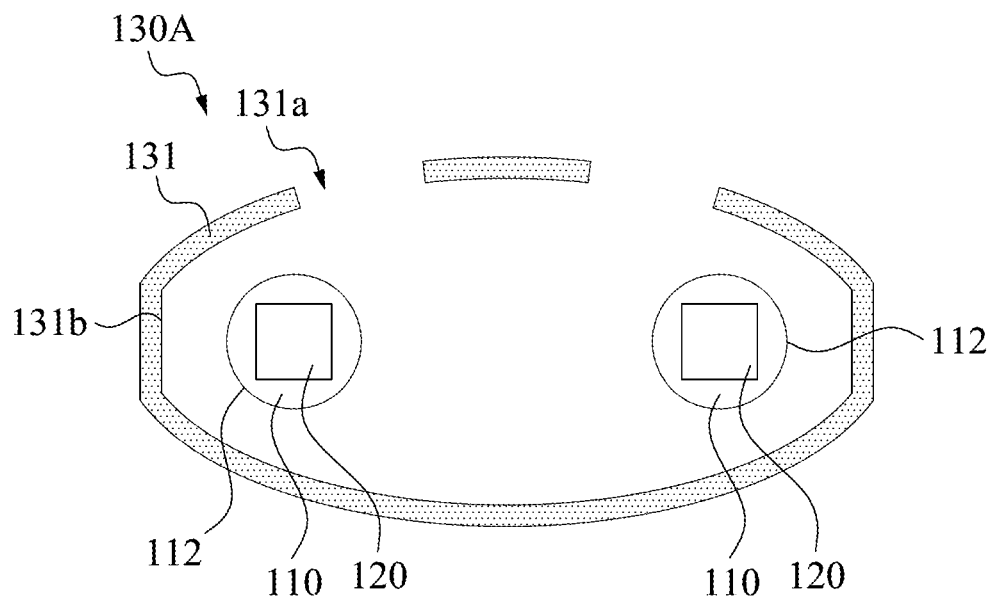
FIG. 7 is a cross-sectional view of a traceable optical device according to some embodiments of the present disclosure.

Reference is made to FIG. 7. FIG. 7 is a cross-sectional view of a traceable optical device 100E according to some embodiments of the present disclosure. As shown in FIG. 7, in some embodiments, the traceable optical device 100E includes two light guide members 110, two light sources 120, and a shielding member. The light sources 120 are optically coupled to the light guide members 110 respectively. The light guide members 110, the light sources 120, and the shielding member are identical or similar to those of the embodiments as illustrated by FIGS. 2A-3, therefore descriptions of these components are the same and would not be repeated here for simplicity. Compared to the embodiments as illustrated by FIGS. 2A-3, because the traceable optical device 100E of the embodiments as illustrated by FIG. 7 includes the two light guide members 110 and the two light sources 120, the traceable optical device 100E may have a greater total light output. As such, the traceable optical device 100E can provide a traceable optical feature with a higher brightness contrast which can be easier to be identified.

Figure 8:
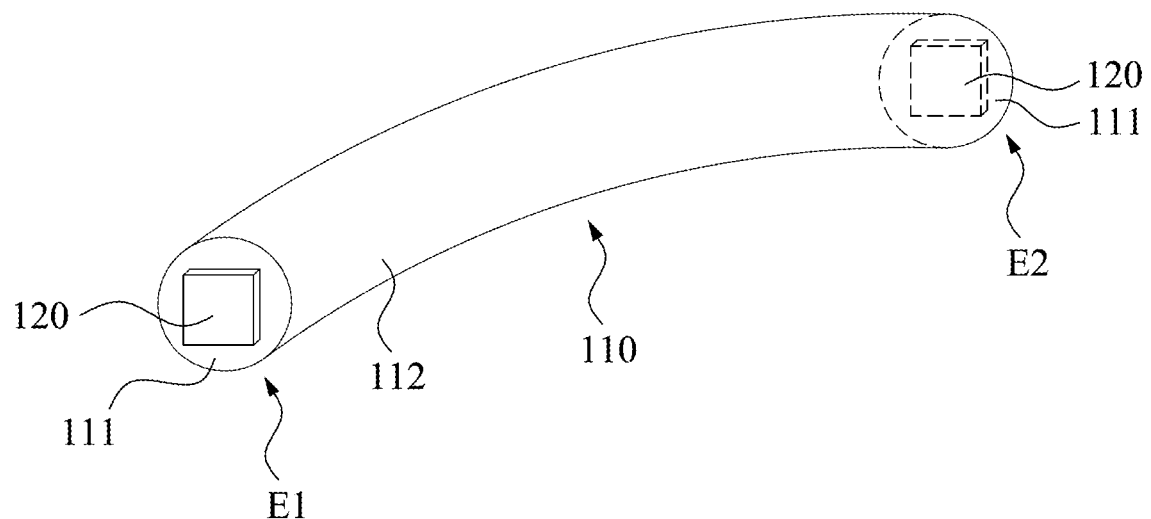
FIG. 8 is a schematic view of components in a traceable optical device according to some embodiments of the present disclosure.

Reference is made to FIG. 8. FIG. 8 is a schematic view of components in a traceable optical device (e.g., the traceable optical device 100A as shown in FIGS. 2A-3) according to some embodiments of the present disclosure. As shown in FIGS. 2A and 8, in some embodiments, the traceable optical device 100A may include one light guide member 110 and two light sources 120. The light guide member 110 has two light-incident surfaces 111 respectively at two ends E1, E2 of the light guide member 110. The light-incident surfaces 111 and the light-emitting surface 112 form an entire appearance of the light guide member 110. As such, a greater luminous flux may be transmitted in the light guide member 110, and the light leaving the light-emitting surface 112 of the light guide member 110 may have a greater total light output, such that the traceable optical device 100A can provide a traceable optical feature with a higher brightness contrast which can be easier to be identified.

Figure 9:
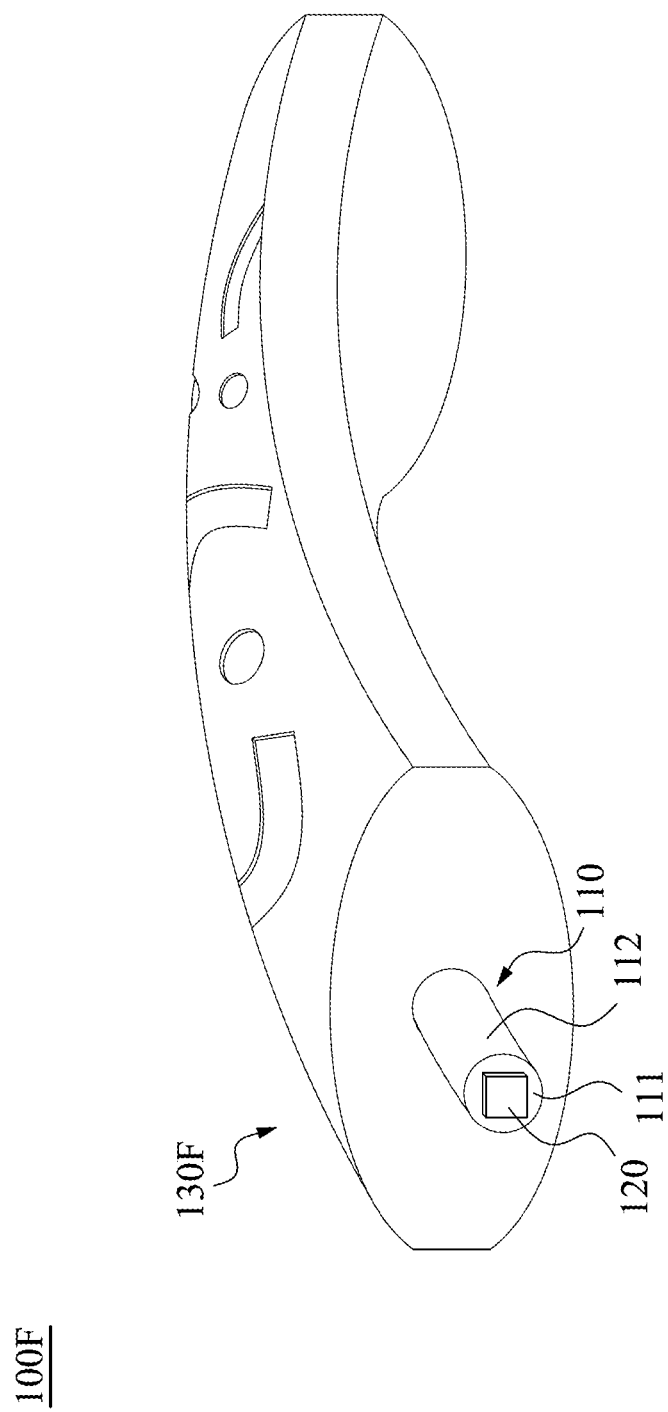
FIG. 9 is a schematic view of a traceable optical device according to some embodiments of the present disclosure.

Reference is made to FIG. 9. FIG. 9 is a schematic view of a traceable optical device 100F according to some embodiments of the present disclosure. As shown in FIG. 9, in some embodiments, the traceable optical device 100F includes a light guide member 110, a light source 120, and a shielding member. The light guide member 110 and the light source 120 are identical or similar to those of the embodiments as illustrated by FIGS. 2A-3, therefore descriptions of these components are the same and would not be repeated here for simplicity. Compared to the embodiments as illustrated by FIGS. 2A-3, the shielding member of the embodiments as illustrated by FIG. 9 includes a hollow housing 130F through which the light guide member 110 passes. That is, the light source 120 is outside the hollow housing 130F. As such, the light source 120 can be easily replaced with other kinds of light sources (e.g., the light sources of other colors) as needed.

Figure 10:
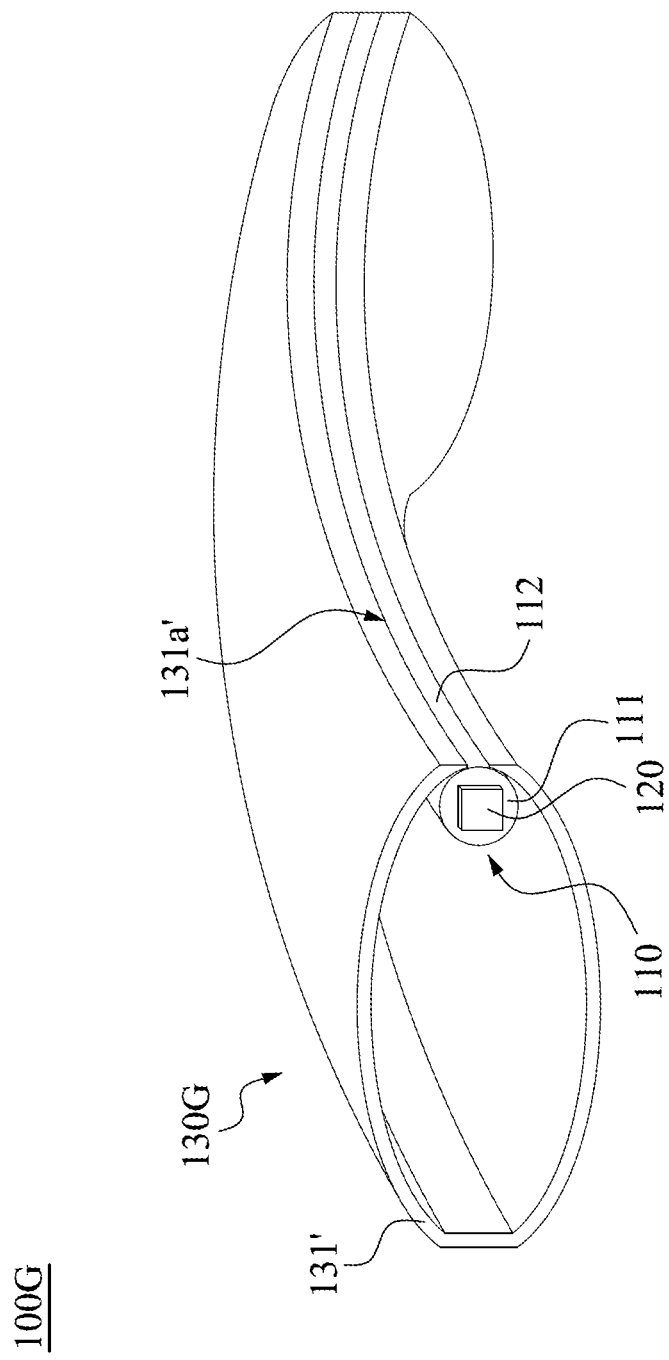
FIG. 10 is a schematic view of a traceable optical device according to some embodiments of the present disclosure.

Reference is made to FIG. 10. FIG. 10 is a schematic view of a traceable optical device 100G according to some embodiments of the present disclosure. As shown in FIG. 10, in some embodiments, the traceable optical device 100G includes a light guide member 110, a light source 120, and a shielding member. The light guide member 110 and the light source 120 are identical or similar to those of the embodiments as illustrated by FIGS. 2A-3, therefore descriptions of these components are the same and would not be repeated here for simplicity. Compared to the embodiments as illustrated by FIGS. 2A-3, the shielding member of the embodiments as illustrated by FIG. 10 includes a hollow housing 130G. The hollow housing 130G has an opening 131a' extending at a side surface thereof. The light-emitting surface 112 of the light guide member 110 is in contact with an edge of the opening 131a'. In other words, the light-emitting surface 112 of the light guide member 110 is close to the opening 131a', such that most of the light leaving the hollow housing 130G directly travels from the light-emitting surface 112 to the opening 131a'. In some embodiments, light-emitting surface 112 of the light guide member 110 may further seal the opening 131a'. As such, since a part of the light-emitting surface 112 forms a part of an appearance of the traceable optical device 100G, the traceable optical device 100G may have a low light loss and provide a traceable optical feature with the highest brightness contrast. In addition, dirt (e.g., dust or liquid) can be prevented from entering the hollow housing 130G by the light guide member 110.

Figure 11:
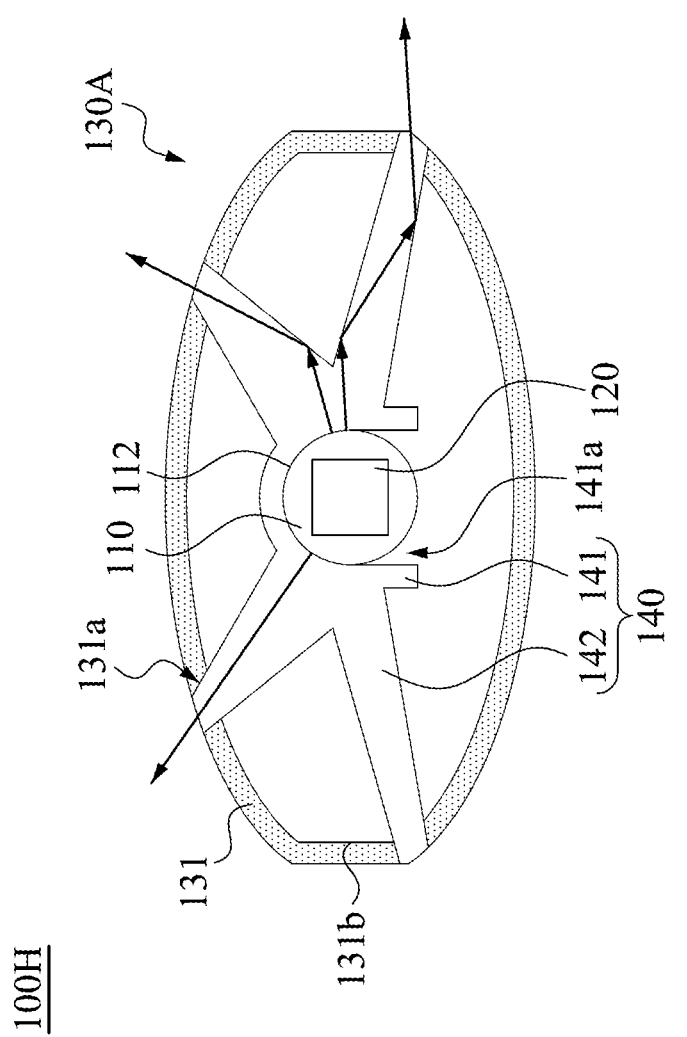
FIG. 11 is a cross-sectional view of a traceable optical device according to some embodiments of the present disclosure.

Reference is made to FIG. 11. FIG. 11 is a cross-sectional view of a traceable optical device 100H according to some embodiments of the present disclosure. As shown in FIG. 11, in some embodiments, the traceable optical device 100H includes a light guide member 110, a light source 120, and a shielding member. The light guide member 110, the light source 120, and the shielding member are identical or similar to those of the embodiments as illustrated by FIGS. 2A-3, therefore descriptions of these components are the same and would not be repeated here for simplicity. Compared to the embodiments as illustrated by FIGS. 2A-3, the shielding member of the embodiments as illustrated by FIG. 11 further includes a light distribution member 140 in the hollow housing 130A. The light distribution member 140 is connected to the light guide member 110 and optically coupled between the light-emitting surface 112 and the light transmission areas (i.e., the openings 131a). As discussed above, the light uniformly leaves the light-emitting surface 112 of the light guide member 110. The light distribution member 140 is configured to receive the light leaving the light-emitting surface 112 and evenly distribute the received light to each of the openings 131a. In detail, also according to the principle of total internal reflection, the light emitted from the light-emitting surface 112 of the light guide member 110 is transmitted forward through the light distribution member 140. The light distribution member 140 can more directly guide the light flux emitted from the light-emitting surface 112 of the light guide member 110 to the openings 131a. In some embodiments, the light distribution member 140 may be made of a transparent material (e.g., plastic, polymer, glass, etc.).

In some embodiments, the light distribution member 140 includes a connecting portion 141 and a plurality of extending portions 142 connected to the connecting portion 141. The light distribution member 140 is detachably engaged with the light guide member 110 through the connecting portion 141. Specifically, the connecting portion 141 has a recess 141a, and the light guide member 110 is accommodated in and engaged with the recess 141a, such that most of the light leaving the light-emitting surface 112 of the light guide member 110 may be received by the connecting portion 141 as far as possible. The extending portions 142 are extended from the connecting portion 141 to the openings 131a, respectively. In some embodiments, extending portions 142 entirely fill the openings 131a, respectively, such that dirt (e.g., dust or liquid) can be prevented from entering the hollow housing 130A. In some embodiments, in addition to the surface in contact with the light-emitting surface 112 of the light guide member 110 and the surfaces respectively exposed to the openings 131a, the other surfaces of the light distribution member 140 may be coated with a reflective layer (e.g., a metal layer) to prevent light leakage. In some embodiments, for unimpeded transmission of the luminous flux from the light guide member 110 to the light distribution member 140, the light guide member 110 and the light distribution member 140 may be made of an identical material.

In some embodiments, the light guide member 110 and the light distribution member 140 form a unitary structure and have different refractive indices. In some embodiments, for unimpeded transmission of the luminous flux from the light guide member 110 to the light distribution member 140, the refractive index of the light guide member 110 is greater than the refractive index of the light distribution member 140.

Figure 12:
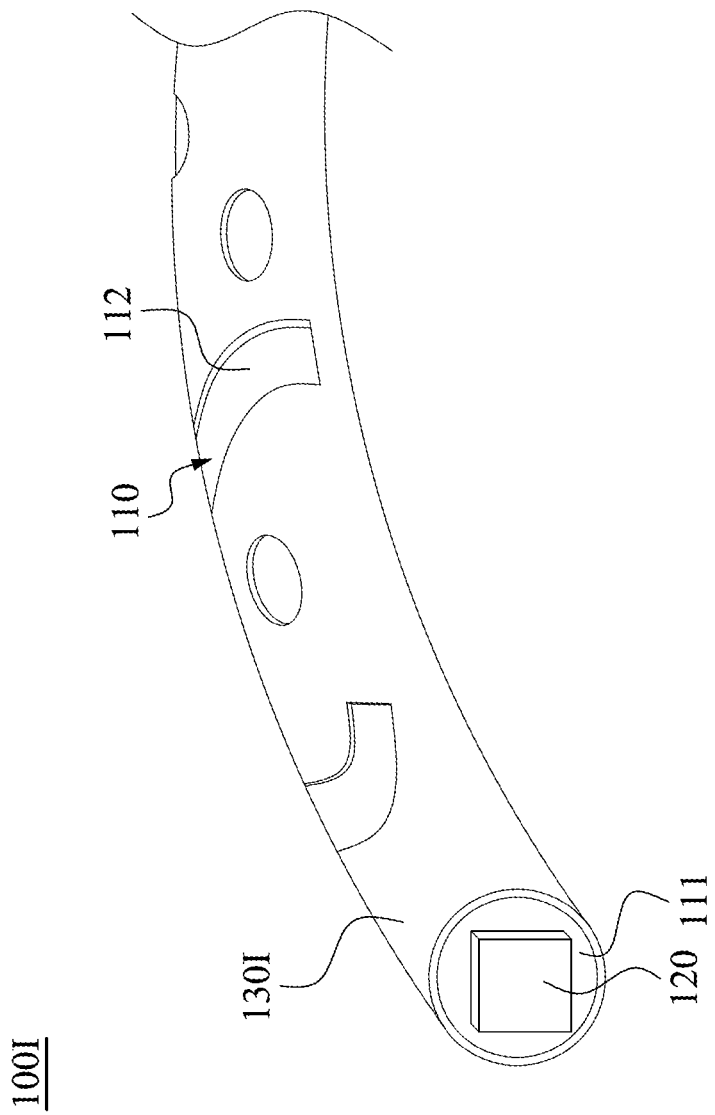
FIG. 12 is a schematic view of a traceable optical device according to some embodiments of the present disclosure.

Reference is made to FIG. 12. FIG. 12 is a schematic view of a traceable optical device 100I according to some embodiments of the present disclosure. As shown in FIG. 12, in some embodiments, the traceable optical device 100I includes a light guide member 110, a light source 120, and a shielding member. The light guide member 110 and the light source 120 are identical or similar to those of the embodiments as illustrated by FIGS. 2A-3, therefore descriptions of these components are the same and would not be repeated here for simplicity. Compared to the embodiments as illustrated by FIGS. 2A-3, the shielding member of the embodiments as illustrated by FIG. 11 is an opaque layer 1301 coated on the light-emitting surface 112 of the light guide member 110. As such, since a part of the light-emitting surface 112 forms a part of an appearance of the traceable optical device 100I, the traceable optical device 100I may have a low light loss and provide a traceable optical feature with the highest brightness contrast.

According to the foregoing recitations of the embodiments of the disclosure, it can be seen that in the traceable optical device of the present disclosure, after the light source emits light into the light guide member, the light can be transmitted in the light guide member and uniformly leave the light guide member from the light-emitting surface thereof. The light leaving the light guide member passes through the light transmission area of the shielding member to be detected. As such, the traceable optical device can provide a traceable optical feature with high brightness contrast which can be easily identified, so that the location and/or orientation of the traceable optical device can be easily determined. Moreover, by using the light guide member to transmit the light emitted from the light source and uniformly distribute the light leaving from the light-emitting surface thereof, the need to increase the number of the light source can be greatly reduced, so that the traceable optical device is low in electrical power loss.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A traceable optical device capable of being tracked by an electronic device having an image sensor, comprising:
   a light guide member having at least one light-incident surface and a light-emitting surface connected to each other;
   at least one light source configured to emit light into the light guide member from said at least one light-incident surface;
   a shielding member shielding the light guide member and having a plurality of light transmission areas; and
   a light distribution member detachably engaged with the light guide member and comprising a connecting portion and a plurality of extending portions respectively extended to the light transmission areas, wherein two of the extending portions are respectively located at opposite sides of the connecting portion and extend away from each other.

2. The traceable optical device of claim 1, wherein the shielding member comprises a hollow housing, and at least a part of the light guide member is in the hollow housing.

3. The traceable optical device of claim 2, wherein the light guide member and said at least one light source are in the hollow housing.

4. The traceable optical device of claim 2, wherein said at least one light source is outside the hollow housing.

5. The traceable optical device of claim 2, wherein the shielding member further comprises a reflective layer on an inner surface of the hollow housing.

6. The traceable optical device of claim 2, wherein the shielding member further comprises a light diffusion structure on an inner surface of the hollow housing.

7. The traceable optical device of claim 2, wherein the light distribution member is in the hollow housing and optically coupled between the light-emitting surface and the light transmission areas.

8. The traceable optical device of claim 7, wherein the light guide member and the light distribution member form a unitary structure and have different refractive indices.

9. The traceable optical device of claim 8, wherein the refractive index of the light guide member is greater than the refractive index of the light distribution member.

10. The traceable optical device of claim 1, wherein the light guide member and the light distribution member are made of an identical material.

11. The traceable optical device of claim 1, wherein the light transmission areas respectively are openings of the hollow housing, and the light distribution member fills the openings.

12. The traceable optical device of claim 2, wherein the light transmission areas respectively are openings of the hollow housing.

13. The traceable optical device of claim 12, wherein the light-emitting surface of the light guide member is in contact with an edge of said at least one opening.

14. The traceable optical device of claim 13, wherein the light-emitting surface of the light guide member seals said at least one opening.

15. The traceable optical device of claim 1, wherein a number of said at least one light-incident surface and a number of said at least one light source are both two, and the light sources are optically coupled to the light-incident surfaces respectively.

16. The traceable optical device of claim 15, wherein the light guide member is tubular and has two ends, and the light-incident surfaces are respectively at the ends of the light guide member.

17. The traceable optical device of claim 1, wherein said at least one light-incident surface and the light-emitting surface form an entire appearance of the light guide member.

18. The traceable optical device of claim 1, wherein:
   the light guide member is tubular having a circumference and two ends, and the light-incident surface is at one of the two ends of the light guide member; and
   the light distribution member surrounds a majority of the circumference of the light guide member.

* * * * *